Figure 1:
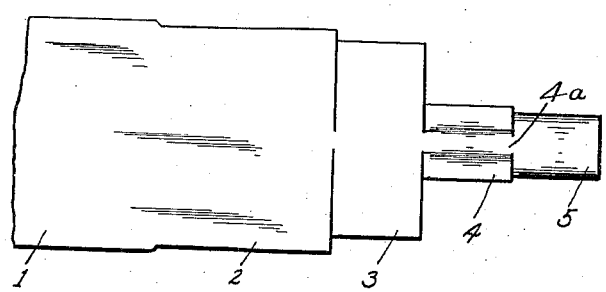

June 26, 1934.  W. H. KLOCKE  1,964,584
METHOD OF AND APPARATUS FOR THE MANUFACTURE OF BEARINGS
Filed May 16, 1930  2 Sheets-Sheet 1

INVENTOR.
WILLIAM H. KLOCKE
BY
Fay Oberlin & Fay
ATTORNEYS.

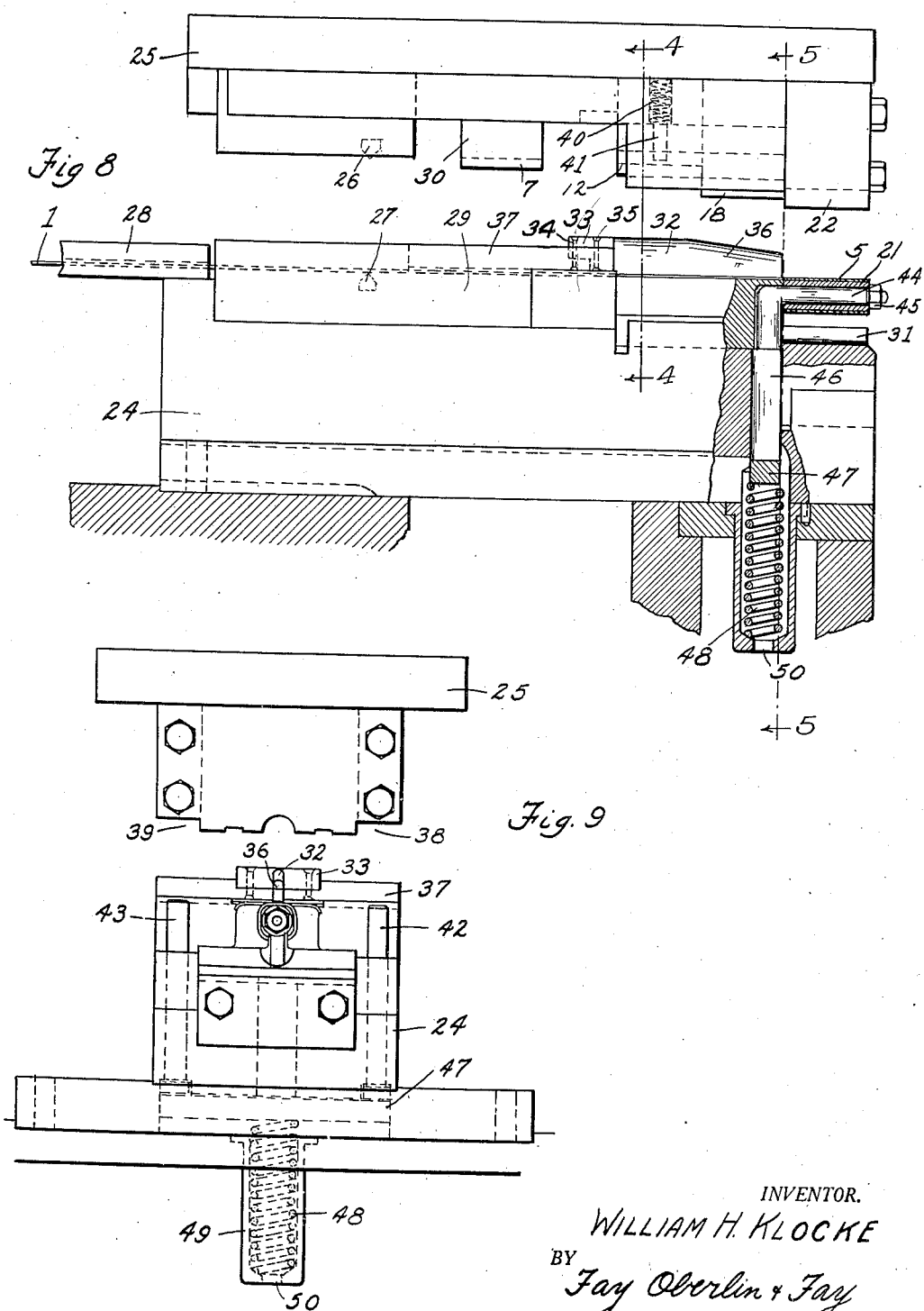

Patented June 26, 1934

1,964,584

UNITED STATES PATENT OFFICE 1,964,584

METHOD OF AND APPARATUS FOR THE MANUFACTURE OF BEARINGS

William H. Klocke, Woodhaven, N. Y., assignor to The Cleveland Graphite Bronze Company, Cleveland, Ohio, a corporation of Ohio Application May 16, 1930, Serial No. 453,049

11 Claims. (Cl. 153—2)

This invention relates to automatic machines, and has for its general object the provision of a novel machine which will automatically form cylinders from flat strips of sheet material. More particularly this invention has for an object the provision of a novel die mechanism which will produce bearings.

A further object is to provide a new mechanism and method of forming cylindrical bearings from strip metal in a progressive die so that with every operation of the die plunger a bearing is produced.

A still further object is to utilize a movable mandrel in conjunction with and as a part of the bed of the die. In securing these objects I have aimed to provide in such a machine a construction which will be simple, expeditious in operation and which will perform all its several functions automatically and continuously on any length of strip stock applied to the machine.

The die apparatus disclosed herein is an improvement upon the apparatus and methods which form the subject matter of two of my copending applications entitled "Method of making sheet metal bearings", Serial No. 316,472 Patent No. 1,787,255 patented December 30, 1930 and "Bearings", Serial No. 327,723. In both of these prior applications the movable mandrel, which assists in the final forming of my bearing, necessitated the utilization of separate mechanisms to insert and withdraw it, while in the present case the mandrel is mounted in the die proper and moves only in a vertical direction. This is extremely advantageous in that less space is required as well as materially fewer parts, and as a further advantage the completed bearing shell is easily ejected.

The chief problem with apparatus of the kind described above is the provision of a mandrel to assist in the final forming, so that such mandrel does not interfere with the normal operation of the reciprocating die. This problem was rendered more acute by the fact that a closed cylinder is being produced, which necessitates sliding the blank on and off, and this sliding precluded the supporting of the mandrel either from above or below. These difficulties have been overcome by my novel apparatus in a manner to be more fully described later.

The annexed drawings and the following description set forth in detail one method and certain mechanism embodying the invention, such disclosed method and means constituting, however, but one of various mechanical forms in which the principle of the invention may be used.

In said annexed drawings:—

Figure 2:
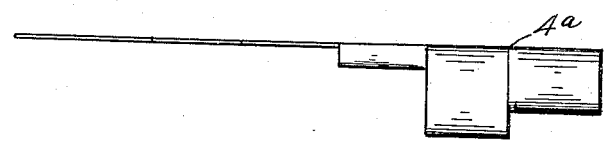
Figure 3:
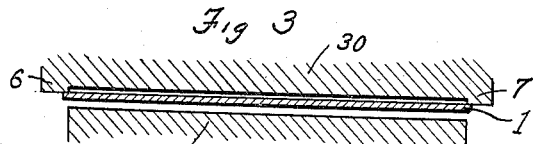
Figure 6:
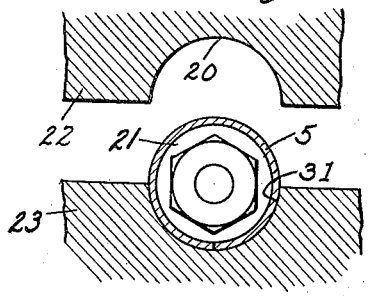
Figure 4:
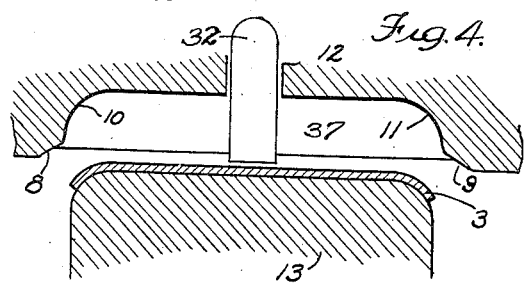
Figure 5:
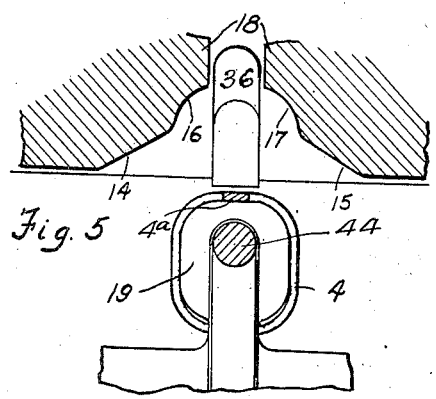
Figure 7:
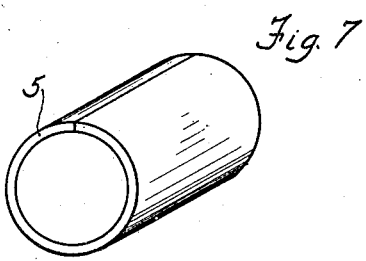

Fig. 1 is a plan view of the strip of said stock showing each of the several operations performed thereon; Fig. 2 is a side elevation of Fig. 1; Fig. 3 is a section through the blanking dies; Fig. 4 is a partial section through the edge bending dies taken on line 4—4; Fig. 5 is a partial section through the second set of bending dies taken on line 5—5; Fig. 6 is a section through the final forming die showing the mandrel in end elevation; Fig. 7 is a perspective view of my completed article; Fig. 8 is a side elevation of the complete mechanism with parts in section; and Fig. 9 is an end elevation of Fig. 8.

In Fig. 1, there is illustrated a strip of stock material having the blanked out portion 2 and the successive stages of forming the bearing. The numeral 3 illustrates the sheared and blanked out portion having its edges bent, while 4 indicates the blank in its substantially elliptical form, and 5 shows the bearing in its completed state. An inspection of Fig. 3 will reveal the blanking dies 29 and 30 which shear the ends of the strip 1 down to the size shown at 2, by means of the shearing edges 6 and 7 on the upper die or punch 30. In Fig. 4 the second step of forming the bearing is shown in which 12 and 13 are the co-acting dies which form the blanked strip 2 into the shape 3 by means of the beveled faces 8 and 9, which first push the edges downwardly. Immediately thereafter the curved faces 10 and 11 round off the edges so that subsequent bending will tend to produce a shell of closed annular shape.

In Fig. 5 the second forming die is illustrated, in which the blank 3 is bent around the substantially elliptical member 19, first by means of the beveled faces 14 and 15 and then by means of the curved faces 16 and 17, which are located on the upper or plunger die 18. It will be obvious from an inspection of this figure that the beveled faces push the outer extremities of the blank downwardly, and that the curved faces force the metal down and under the elliptical member 19. The advantage of double faced die pressing, as shown in this part of the operation, is that a more gradual bending occurs than if a single faced die were used, and this gradual bending does not lessen the strength of the metal. A single faced die would abruptly bend the metal, which might cause a weakening of the metal along the line of bend.

The next operation is shown in Fig. 6, wherein the strip has been moved the width of a bearing and the co-acting dies 22 and 23 are shown on the up stroke after having forced the metal 5 around the mandrel 21 by means of the semicircular dies 20 and 31. From an inspection of Fig. 6 it will now be seen that the cylindrical blank has been forced downwardly and is seated upon the lower die 31. Obviously, when the blank 5 is forced downwardly this portion is severed from the remainder of the blank because the upper small connecting portion 4a between the blanks 4 and 5 is moved out of the plane of the upper portion of the blank 4.

The complete die mechanism is shown in elevation in Fig. 8, in which the die bed is indicated generally by the numeral 24, and the co-acting die plunger is indicated by the numeral 25. The numeral 28 designates the stock guide which is affixed to one end of the die mechanism in order to guide the strip material accurately into the die. The numerals 26 and 27 are attached to scoring tools which are placed in each die in order to score the strip so that it may be readily sheared transversely along the scored lines.

The next elements, 29 and 30, are the blanking dies which operate to cut the strip to a desired length in a manner hereinbefore described. The element 37 is a U-shaped member, the legs of the U extending along the outer portion of the die so that the stripper plate 33 may be attached thereto, and thus be held up above the strip allowing the strip to move thereunder. It will thus be noted that the T-shaped stripper block is suspended from the U-shaped member 37 in order that the blank may pass under the stripper block and the supporting member 37 therefor. The stripper block is suspended in this manner so that a resilient grip may be obtained upon the central longitudinal portion of the blank as the various bending operations take place. The stripper block is T-shaped in form, and is secured to the U member by means of rivets 34 and 35, or other securing means. Extending longitudinally with the die the stripper plate has a raised portion 32 and a beveled portion 36. The numerals 40 and 41 indicate the stripper spring and pin, respectively, there being two of such pins and springs in order to allow the stripper plate to maintain its position without being forced downwardly by the action of the plunger die. The first forming die is shown at 12, the second forming die at 18, and the final forming die at 22, all of said dies being located in the upper or plunger die.

The movable mandrel is shown at 46 having the horizontal core 44 around which a sleeve 21 is fitted. The mandrel is formed in the shape of an L and has its outermost horizontal portion reduced and screw threaded in order to engage the nut 45, which holds the sleeve 21 on the mandrel. The vertical portion 46 of the movable mandrel is supported on a pressure bar 47, which bar is forced upwardly by means of the spring 48 which is held in the casing 49. The lowermost portion of the casing 49 is vented at 50 in order that there will be no interference with the action of the mandrel. Directly in line with the vertical portion of the mandrel 46, two plunger pins 42 and 43 are situated for the purpose of guiding the plunger die accurately down upon the bed. The plunger pins 42 and 43 are also held in place by means of the pressure bar 47.

The operation of the machine is as follows:—

The strip 1 is fed into the machine between the stock guides 28 and is first scored between the scoring tools 26 and 27 in order to provide easier shearing and also for the purpose of providing a smooth edge where the strip is sheared. The strip in this form has the shape shown by numeral 1, Fig. 1. It is then forced between the blanking dies 29 and 30, which reduces the strip to the form shown by the numeral 2. The next step is shearing and bending the edges of the strip, both of said operations being simultaneous. Then the strip is formed into the shape shown in Fig. 5, which is substantially elliptical, after which the elliptical blank is pushed onto the movable mandrel and acted upon by the semicircular dies, which results in the bearing in its final form. Up to the final forming stage in the operation, the central portion still remains an integral part of the initial strip by reason of the stripper plate which prevents its severance therefrom. Immediately after the blank, in its elliptical form, is forced upon the movable mandrel the upper die or punch descends and cuts it off from the remainder of the strip, and practically simultaneously with the cutting operation the bearing is completely formed into its cylindrical shape. The finally formed bearing is ejected from the movable mandrel by means of the movement of the strip which occurs with each stroke of the die, there being a ratchet device or other means situated at the entrance of the die which moves the strip a distance which is exactly equal to the width of the bearing.

The advantages flowing from the use of my improved method and apparatus are the elimination of working parts, the ease with which the finished bearing may be ejected, and the consolidation of the entire mechanism into one unitary structure, thus requiring less space. A further and important advantage is that the cutting of the blank and the final forming thereof is accomplished in one step. It will be noted that the final forming mandrel moves only in a vertical plane, which obviously entails less wear, and that it projects from beneath one set of dies outwardly to a position between another set of dies.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:—

1. In an apparatus for the manufacture of bearings, the combination of means for successively, blanking stock to a desired width, bending the edges of said blank, forming the blank into a substantially oval shape, severing said blank and finally forming the blank into a cylinder.

2. In an apparatus for the manufacture of bearings, the combination of an L-shaped mandrel with means for successively, blanking stock to a desired with, bending the edges of said blank, forming the blank into a substantially oval shape, severing said blank and finally forming the blank about said L shaped mandrel into a cylinder.

3. In an apparatus of the character described, an upper die and a stationary lower die, said lower die having a self-contained L-shaped mandrel, and means for successively operating upon sheet material to produce a cylindrical bearing upon each meeting of the said upper and lower dies.

4. In a progressive die, the combination of a bed, a plunger reciprocating with respect to said bed, stationary dies mounted in said bed and dies mounted in said plunger, scoring means mounted in said bed and in said plunger, and a mandrel mounted in said bed movable in a vertical direction with respect thereto.

5. In an apparatus of the character described, means for transversely scoring a strip of metal, means for removing the edges of said strip, means for partially shearing said strip after said scoring, means for bending the edges of said strip, means for forming the strip into a substantially elliptical shape, means for severing the oval shaped blank from the strip, and means for finally forming the blank into a cylindrical bearing.

6. In a method of manufacturing bearings, the steps which comprise blanking a strip of stock material to a desired width, partially shearing the strip transversely, bending the edges of said strip, pressing the blank into a substantially elliptical form, finally forming the blank into a cylinder and ejecting said cylinder.

7. In a method of forming cylindrical bearings, the steps which consist in scoring strip stock, blanking said strip stock to desired length, partially shearing said strip to a desired width, curving the edges of said sheared blank, pressing said blank into a substantially elliptical form, and finally forming said blank into a cylinder, said strip having an integral mid-portion in all except the last step.

8. In an apparatus for the manufacture of bearings, a bed and a plunger reciprocating with respect to said bed, a plurality of sets of dies mounted in said bed and said plunger, an L shaped mandrel mounted under one set of said dies, and projecting between another set of said dies.

9. In an apparatus for the manufacture of bearings, a bed and a plunger reciprocating with respect to said bed, a plurality of sets of dies mounted in said bed and said plunger, an L shaped mandrel mounted under one set of said dies in said bed.

10. In an apparatus for the manufacture of bearings, a bed and a plunger reciprocating with respect to said bed, a plurality of sets of dies mounted in said bed and said plunger, an L shaped mandrel resiliently mounted under one set of said dies, and projecting between another set of said dies, said mandrel being movable with respect to said bed.

11. In an apparatus of the character described, means for transversely scoring a strip of metal, means for removing the edges of said strip, means for partially shearing said strip after said scoring, means for bending the edges of said strip, means for forming the strip into a substantially elliptical shape, means for severing the oval shaped blank from the strip, means for finally forming the blank into a cylindrical bearing, and means for ejecting said finally formed blank.

WILLIAM H. KLOCKE.